United States Patent
Pan et al.

(10) Patent No.: US 12,432,766 B2
(45) Date of Patent: Sep. 30, 2025

(54) INFORMATION DETERMINATION METHOD AND DEVICE, RECEIVING METHOD AND DEVICE, COMMUNICATION NODE, AND STORAGE MEDIUM

(71) Applicant: ZTE CORPORATION, Shenzhen (CN)

(72) Inventors: Yu Pan, Shenzhen (CN); Chuangxin Jiang, Shenzhen (CN); Zhaohua Lu, Shenzhen (CN); Bo Gao, Shenzhen (CN); Zhen He, Shenzhen (CN); Shujuan Zhang, Shenzhen (CN); Ke Yao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 599 days.

(21) Appl. No.: 17/797,399

(22) PCT Filed: Jan. 28, 2021

(86) PCT No.: PCT/CN2021/074080
§ 371 (c)(1),
(2) Date: Aug. 3, 2022

(87) PCT Pub. No.: WO2021/155756
PCT Pub. Date: Aug. 12, 2021

(65) Prior Publication Data
US 2023/0084983 A1    Mar. 16, 2023

(30) Foreign Application Priority Data
Feb. 4, 2020   (CN) .......................... 202010079956.0

(51) Int. Cl.
*H04W 72/00* (2023.01)
*H04W 16/28* (2009.01)
(Continued)

(52) U.S. Cl.
CPC ......... *H04W 72/542* (2023.01); *H04W 16/28* (2013.01); *H04W 72/0446* (2013.01); *H04W 72/0453* (2013.01); *H04W 72/23* (2023.01)

(58) Field of Classification Search
CPC .............. H04W 72/542; H04W 16/28; H04W 72/0446; H04W 72/0453; H04W 72/23; H04L 1/0003; H04L 1/0031; H04L 1/0026
See application file for complete search history.

(56) References Cited

U.S. PATENT DOCUMENTS

2018/0034529 A1\* 2/2018 Hessler .................. H04B 7/024
2019/0103949 A1\* 4/2019 Harrison .............. H04B 7/0456
(Continued)

FOREIGN PATENT DOCUMENTS

CN    107466451 A    12/2017
CN    108631920 A    10/2018
(Continued)

OTHER PUBLICATIONS

Search Report in Chinese Application No. 202010079956.0, dated Jul. 26, 2024, 8 pages including translation.
(Continued)

*Primary Examiner* — Lan-Huong Truong
(74) *Attorney, Agent, or Firm* — Morgan, Lewis & Bockius LLP (57) ABSTRACT

Provided are an information determination method and device, a receiving method and device, a communication node, and a medium. The method includes: receiving indication information; and determining channel state information of M physical uplink channel transmissions according to the indication information, where M is an integer greater than or equal to 1.

14 Claims, 4 Drawing Sheets

(51) Int. Cl.
*H04W 72/0446* (2023.01)
*H04W 72/0453* (2023.01)
*H04W 72/23* (2023.01)
*H04W 72/542* (2023.01)

(56) References Cited

U.S. PATENT DOCUMENTS

| | | | |
|---|---|---|---|
| 2019/0158257 | A1 | 5/2019 | Sano et al. |
| 2019/0313436 | A1 | 10/2019 | Lee et al. |
| 2021/0051596 | A1 | 2/2021 | Lee et al. |
| 2022/0007410 | A1* | 1/2022 | Cirik ................ H04W 72/1273 |

FOREIGN PATENT DOCUMENTS

| | | |
|---|---|---|
| CN | 108650066 A | 10/2018 |
| CN | 108809476 A | 11/2018 |
| CN | 110192417 A | 8/2019 |
| CN | 110535614 A | 12/2019 |
| CN | 110536450 A | 12/2019 |
| CN | 111901066 A | 11/2020 |
| EP | 3820224 A1 * | 5/2021 ........... H04L 1/0003 |
| WO | WO2019/151789 A1 | 8/2019 |

OTHER PUBLICATIONS

Office Action in Chinese Application No. 202010079956.0, dated Jul. 30, 2024, 10 pages including translation.
Zhang et al., "System Status and Development of NB-Iot":, ZTE Technology Journal. Feb. 2017, vol. 23, No. 1, pp. 10-14, DOI: 10.3969/j.issn.1009-6868.2017.01.003.
International Search Report for Application No. PCT/CN2021/074080, dated Apr. 16, 2021, 4 pages (including translation).
Extended European Search Report for Application No. 21751259.9, dated Jan. 30, 2024, 9 pages.
Lenovo et al., "Discussion on UL multi-panel transmission", 3GPP TSG RAN WG1 Meeting #96bis, R1-1904574, Apr. 8, 2019, 8 pages.
Nokia et al., "NR-U uplink signals and channels", 3GPP TSG RAN WG1 Meeting #97, R1-1906643, May 13, 2019, 15 pages.

* cited by examiner

INFORMATION DETERMINATION METHOD AND DEVICE, RECEIVING METHOD AND DEVICE, COMMUNICATION NODE, AND STORAGE MEDIUM

CROSS REFERENCE TO RELATED APPLICATIONS

The is a National Stage Application filed under 35 U.S.C. 371 based on International Patent Application No. PCT/CN2021/074080, filed on Jan. 28, 2021, which claims priority to Chinese Patent Application No. 202010079956.0, filed with the China National Intellectual Property Administration (CNIPA) on Feb. 4, 2020, the contents of which are incorporated herein by reference in their entireties.

TECHNICAL FIELD

The present application relates to wireless communication networks, and for example, to an information determination method and device, a receiving method and device, a communication node, and a storage medium.

BACKGROUND

The uplink grant-free transmission of the fifth generation (5G) mobile communication technology may support a repeated transmission in a time domain, but multiple complex factors such as space, a frequency domain, and a beam are involved in an uplink transmission process. The repeated transmission is an effective means of improving the reliability, and may improve the transmission reliability of a wireless communication system, in particular, improve the transmission reliability of ultra-reliable and low latency communication (URLLC). In a scenario where the repeated transmission is supported, there is no an effective mechanism for uniformly and efficiently planning a physical uplink channel transmission is lacked; therefore, a terminal side cannot accurately determine channel state information for the physical uplink channel transmission, and the reliability of the physical uplink channel transmission is poor.

SUMMARY

The present application provides an information determination method and device, a receiving method and device, a communication node, and a storage medium, to improve the reliability of the physical uplink channel transmission.

An embodiment of the present application provides an information determination method. The method includes that: indication information is received; and channel state information of M physical uplink channel transmissions is determined according to the indication information, where M is an integer greater than or equal to 1.

An embodiment of the present application further provides a receiving method. The method includes that: indication information is sent; and M physical uplink channel transmissions are received, where M is an integer greater than or equal to 1.

An embodiment of the present application further provides an information determination device. The information determination device includes an indication information receiving module and an information determination module. The indication information receiving module is configured to receive indication information. The information determination module is configured to determine channel state information of M physical uplink channel transmissions according to the indication information, where M is an integer greater than or equal to 1.

An embodiment of the present application further provides a receiving device. The receiving device includes an indication module and a receiving module. The indication module is configured to send indication information. The receiving module is configured to receive M physical uplink channel transmissions, where M is an integer greater than or equal to 1.

An embodiment of the present application further provides a communication node. The communication node includes one or more processors and a storage device. The storage device is configured to store one or more programs. The one or more programs, when executed by the one or more processors, cause the one or more processors to implement the information determination method or the receiving method described above.

An embodiment of the present application further provides a computer-readable storage medium. The computer-readable storage medium stores a computer program, where the program, when executed by a processor, implements the information determination method or the receiving method described above.

DETAILED DESCRIPTION

The present application will be described in conjunction with the drawings and embodiments below. It should be understood that the embodiments described herein are merely used for explaining the present application and are not intended to limit the present application. For ease of description, only some, but not all, of the structures related to the present application are shown in the drawings.

In a scenario where a repeated transmission is supported and multiple complex factors such as space, a time domain, a frequency domain and a beam are involved, there is no effective mechanism for uniformly and efficiently planning a physical uplink channel transmission, and the reliability of the physical uplink channel transmission is low due to a fact that channel state information of the physical uplink channel transmission cannot be accurately determined.

An embodiment of the present application provides an information determination method, and the method includes that: channel state information of each repeated transmission is accurately determined according to indication information, and a transmission is performed based on this so as to improve the reliability of the physical uplink channel transmission.

Figure 1:
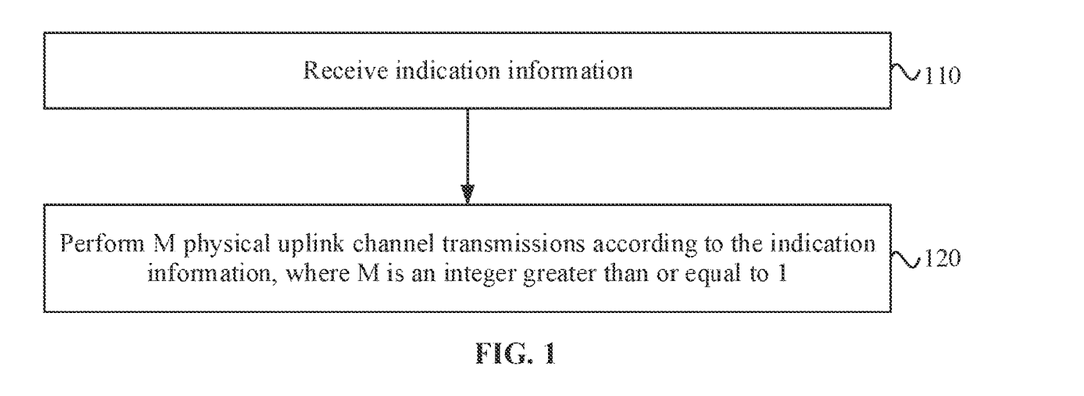
FIG. 1 is a flowchart of an information determination method according to an embodiment.

FIG. 1 is a flowchart of an information determination method according to an embodiment. The information determination method of this embodiment may be applied to a first communication node, and the first communication node may be a user equipment (UE). As shown in FIG. 1, the method of this embodiment includes operations 110 and 120.

In 110, indication information is received.

In 120, channel state information of M physical uplink channel transmissions is determined according to the indication information, where M is an integer greater than or equal to 1.

In this embodiment, the UE receives indication information of a second communication node (the second communication node is a service node, such as a base station), and performs M physical uplink channel transmissions such as physical uplink shared channel (PUSCH) transmissions according to the indication information. The M physical uplink channel transmissions may be a transmission of M physical uplink channel resources used for transmitting physical uplink data, or a transmission of one physical uplink channel resource at different transmission times, different transmission carriers and different transmission sub-bands, or a transmission of different layers. The M physical uplink channel transmissions correspond to a certain number of uplink transmission blocks, and an uplink transmission may be completed according to the uplink transmission blocks based on space, a time domain, a frequency domain and the like, so that the physical uplink channel transmissions are uniformly and efficiently performed, and thus the reliability of the uplink transmission is improved. The M physical uplink channel transmissions may correspond to different antenna panels of the UE. The antenna panels may be one transmission and reception point or a communication node. The different antenna panels may be replaced with spatial parameters such as a sending beam, a receiving beam, a spatial transmission filter, and a quasi-co-location type D. The spatial transmission filter in the present application determines directions of the sending beam and the receiving beam on the antenna panel. For example, PUSCH transmissions corresponding to a same spatial transmission filter may be transmitted by a same antenna panel, that is, PUSCH transmissions corresponding to a same spatial transmission filter have a same sending beam direction.

In an embodiment, the indication information includes at least one of: a transmission scheme indication, a time-frequency domain resource indication, or a transmission block number indication. The time-frequency domain resource indication and the transmission block number indication respectively correspond to the transmission scheme indication. The channel state information includes at least one of: a time-frequency domain resource, the number of transmission blocks, a spatial transmission filter, a redundancy version (RV), a transmitted precoding matrix indicator (TPMI), a demodulation reference signal (DMRS) port, a modulation and coding scheme (MCS), or a power control parameter.

In this embodiment, the transmission scheme indication is used for indicating a transmission scheme of the physical uplink channel transmissions, so that the number of transmission blocks, a correspondence between the M physical uplink channel transmissions and the transmission blocks, a time-frequency domain resource occupied by each physical uplink channel transmission and the like are correspondingly indicated; therefore, the UE may accurately determine the channel state information and perform the physical uplink channel transmissions.

In an embodiment, the indication information is indicated by at least one of following information domains: radio resource control (RRC) signaling, a media access control-control element (MAC-CE), or downlink control information (DCI).

In an embodiment, in a case where the transmission scheme indication is a first transmission scheme, the transmission block number indication corresponding to the transmission scheme indication is 1, and the time-frequency domain resource indication corresponding to the transmission scheme indication is that: the M physical uplink channel transmissions correspond to a same time domain resource; and each physical uplink channel transmission corresponds to a segment of frequency domain resource, where the segments of frequency domain resources are non-overlapping.

In this embodiment, the M physical uplink channel transmissions correspond to one uplink transmission block, the M physical uplink channel transmissions occupy a same time domain resource and different frequency domain resources, and the M physical uplink channel transmissions correspond to M segments of frequency domain resources which are non-overlapping with each other.

In an embodiment, in a case where the transmission scheme indication is a second transmission scheme, the transmission block number indication corresponding to the transmission scheme indication is M, and the time-frequency domain resource indication corresponding to the transmission scheme indication is that: the M physical uplink channel transmissions correspond to M same uplink transmission blocks; the M physical uplink channel transmissions correspond to a same time domain resource and a same frequency domain resource; each uplink transmission block corresponds to a one-layer transmission or a multi-layer transmission.

In this embodiment, the M physical uplink channel transmissions correspond to M same uplink transmission blocks. The uplink transmission block may also be referred to as transmission information, such as information before channel coding, a coding block in uplink information, or a large coding block corresponding to multiple sub-coding blocks. The M same uplink transmission blocks mean that M uplink transmission blocks carry identical information to be transmitted, that is, the M uplink transmission blocks are transmitted repeatedly. The M physical uplink channel transmissions occupy a same time domain resource and a same frequency domain resource, and each uplink transmission block corresponds to a one-layer transmission or a multi-layer transmission.

In an embodiment, in a case where the transmission scheme indication is a third transmission scheme, the transmission block number indication corresponding to the transmission scheme indication is M, and the time-frequency domain resource indication corresponding to the transmission scheme indication is that: the M physical uplink channel transmissions correspond to M same uplink transmission blocks; and the M physical uplink channel transmissions correspond to a same time domain resource; each physical uplink channel transmission corresponds to a segment of frequency domain resource, where the segments of frequency domain resources are non-overlapping.

In this embodiment, the M physical uplink channel transmissions correspond to M same uplink transmission blocks, the M physical uplink channel transmissions occupy a same time domain resource and different frequency domain resources, and the M physical uplink channel transmissions correspond to M segments of frequency domain resources which are non-overlapping with each other.

In an embodiment, in a case where the transmission scheme indication is a fourth transmission scheme, the transmission block number indication corresponding to the transmission scheme indication is M, and the time-frequency domain resource indication corresponding to the transmission scheme indication is that: the M physical uplink channel transmissions correspond to M same uplink transmission blocks; each physical uplink channel transmission corresponds to a segment of time domain resource, and the segments of time domain resources are non-overlapping; the M physical uplink channel transmissions correspond to N segments of frequency domain resources, where the segments of frequency domain resources are non-overlapping, and N is an integer greater than or equal to 1 and N is less than or equal to M.

In this embodiment, the M physical uplink channel transmissions correspond to M same uplink transmission blocks, that is, the M uplink transmission blocks are repeatedly transmitted. The M physical uplink channel transmissions occupy different time domain resources and N segments of frequency domain resources which are non-overlapping, where 1≤N≤M. In a case of N=1, the M physical uplink channel transmissions correspond to a same frequency domain resource. In a case of N=M, the M physical uplink channel transmissions correspond to frequency domain resources which are non-overlapping. In a case of 1<N<M, and a same condition and a non-overlapping condition exist in frequency domain resources corresponding to the M physical uplink channel transmissions.

In some embodiments, N is the number of spatial transmission filters, that is, the M physical uplink channel transmissions correspond to N spatial transmission filters.

In an embodiment, in a case where the transmission scheme indication is a fifth transmission scheme, the transmission block number indication corresponding to the transmission scheme indication is M, and the time-frequency domain resource indication corresponding to the transmission scheme indication is that: the M physical uplink channel transmissions correspond to M same uplink transmission blocks; the M physical uplink channel transmissions correspond to a same frequency domain resource; each physical uplink channel transmission corresponds to a segment of time domain resource, where the segments of time domain resources are non-overlapping.

In this embodiment, the M physical uplink channel transmissions correspond to M same uplink transmission blocks, the M physical uplink channel transmissions occupy a same frequency domain resource and different time domain resources, and the M physical uplink channel transmissions correspond to M segments of time domain resources which are non-overlapping.

In an embodiment, the frequency domain resources of the M physical uplink channel transmissions include a first frequency domain resource and a second frequency domain resource; and the frequency domain resources of the M physical uplink channel transmission correspond to a first frequency offset and a second frequency offset. The first frequency offset is a difference value between a starting frequency of the second frequency domain resource and a starting frequency of the first frequency domain resource, and the second frequency offset is a difference value between the starting frequency of the first frequency domain resource and a starting frequency of a bandwidth part (BWP).

In this embodiment, the frequency domain resources of the M physical uplink channel transmissions are divided into two parts, that is, the first frequency domain resource and the second frequency domain resource. A first frequency offset $X_{offset}$ is formed between (starting frequencies) of the two frequency domain resources, and a second frequency offset $X_{start}$ is formed between a starting frequency of the first frequency domain resource and a starting frequency of the BWP.

In an embodiment, in a case where the second frequency offset is not 0 and a frequency range of at least one physical uplink channel transmission exceeds a boundary of the BWP, a frequency part exceeding the boundary is transmitted through a target frequency band of the BWP. The target frequency band includes a frequency band between the starting frequency of the BWP and the starting frequency of the first frequency domain resource.

In this embodiment, $X_{start}$ after the starting frequency of the BWP is the starting frequency of the first frequency domain resource, $X_{offset}$ after the starting frequency of the first frequency domain resource is the starting frequency of the second frequency domain resource, and if $X_{start}$ is not 0 and a frequency range of the later physical uplink channel transmission exceeds the boundary of the BWP due to the existence of $X_{start}$ and $X_{offset}$, a part exceeding the boundary is transmitted through a frequency band of $X_{start}$ (the part exceeding the boundary may be one physical uplink channel transmission, or there may be multiple physical uplink channel transmissions exceeding the boundary), so as to improve the utilization rate of resources and improve the reliability of the uplink transmission.

In an embodiment, the M physical uplink channel transmissions correspond to a same MCS.

In an embodiment, the M physical uplink channel transmissions correspond to a same DMRS port; or the M physical uplink channel transmissions correspond to M different DMRS ports, where M is greater than or equal to 2.

In an embodiment, the M physical uplink channel transmissions correspond to a same TPMI; physical uplink channel transmissions corresponding to a same spatial transmission filter correspond to a same TPMI; or each physical uplink channel transmission corresponds to one TPMI, and TPMIs are circularly arranged according to a sequence of a codebook table.

In this embodiment, there are three correspondences between the M physical uplink channel transmissions and the TPMIs, each physical uplink channel transmission sequentially corresponds to one TPMI, and the TPMI being circularly arranged according to the sequence of the codebook table means that: the UE may poll and select TPMIs to sequentially correspond to the M physical uplink channel transmissions according to TPMIs and an arrangement sequence of the TPMIs given in the codebook table. For example, in Table 7.3.1.1.2-3 in 38.212, if an antenna property of the UE is a partial antenna correlated transmission, the base station indicates a starting index value of 4 to the UE, which corresponds to TPMI=4, and then the UE sequentially selects index values of the TPMIs according to the order of the "antenna uncorrelated and partially correlated" column in the middle of the table, applies TPMI=4 to a first PUSCH transmission, applies TPMI=5 to a second PUSCH transmission, and so on.

In an embodiment, the M physical uplink channel transmissions correspond to a same RV; physical uplink channel transmissions corresponding to a same spatial transmission filter correspond to a same RV; or each physical uplink channel transmission sequentially corresponds to one RV, and RVs are circularly arranged according to a set sequence.

In this embodiment, there are three correspondences between the M physical uplink channel transmissions and the RVs, each physical uplink channel transmission sequentially corresponds to one RV, and the RVs being circularly arranged according to the set sequence means that: the UE may poll and select the RVs to sequentially correspond to the M physical uplink channel transmissions according to the set sequence (such as 0-2-3-1) of the RVs. For example, a first physical uplink channel transmission corresponds to RV1, a second physical uplink channel transmission corresponds to RV2, a third physical uplink channel transmission corresponds to RV3, a fourth physical uplink channel transmission corresponds to RV4, a fifth physical uplink channel transmission corresponds to RV1, and so on.

In an embodiment, the M physical uplink channel transmissions correspond to N spatial transmission filters, and the M physical uplink channel transmissions correspond to N sets of power control parameters, where N is an integer greater than or equal to 1 and N is less than or equal to M. The N spatial transmission filters are determined according to one of: a transmission configuration indication (TCI) state, quasi-co-location (QCL), sounding reference signal resource indicator (SRI) information, spatial relation information, a sounding reference signal (SRS), a channel state information reference signal (CSI-RS), or a synchronization signal block (SSB).

In this embodiment, a set of power control parameters includes: an open loop power control parameter (P0-PUSCH-AlphaSet), a path loss reference signal (PUSCH-Pathloss Reference Signal), and a closed loop process parameter (twoPUSCH-PC-Adjust States).

In an embodiment, first X physical uplink channel transmissions among the M physical uplink channel transmissions correspond to first Y spatial transmission filters, and last X physical uplink channel transmissions among the M physical uplink channel transmissions correspond to last Y spatial transmission filters; or, odd physical uplink channel transmissions among the M physical uplink channel transmissions correspond to first Y spatial transmission filters, and even physical uplink channel transmissions among the M physical uplink channel transmissions correspond to last Y spatial transmission filters; or, every two physical uplink channel transmissions among the M physical uplink channel transmissions are used as one group, odd groups of physical uplink channel transmissions correspond to first Y spatial transmission filters, and even groups of physical uplink channel transmissions correspond to last Y spatial transmission filters; where X is a half of M, and Y is a half of N.

In this embodiment, the M physical uplink channel transmissions correspond to N spatial transmission filters, where M≥N. First M/2 physical uplink channel transmissions correspond to first N/2 spatial transmission filters, and last M/2 physical uplink channel transmissions correspond to last N/2 spatial transmission filters; or, odd physical uplink channel transmissions correspond to first N/2 spatial transmission filters, and even physical uplink channel transmissions correspond to last N/2 spatial transmission filters; or, odd groups of physical uplink channel transmissions correspond to first Y spatial transmission filters, and even groups of physical uplink channel transmissions correspond to last Y spatial transmission filters, for example, the 1st, 2nd, 5th, 6th, . . . (M−3)th, (M−2)th physical uplink channel transmissions correspond to first Y spatial transmission filters, and the 3rd, 4th, 7th, 8th, . . . (M−1)th, Mth transmissions correspond to last Y spatial transmission filters.

In an embodiment, physical uplink channel transmissions corresponding to a same spatial transmission filter correspond to a same power control parameter.

Taking the physical uplink channel transmission being the PUSCH transmission as an example, the information determination method for the M physical uplink channel transmissions is described by following different examples.

Example One

In this example, M PUSCH transmissions correspond to M same uplink transmission blocks, that is, a serving node schedules the UE to perform M PUSCH repeated transmissions on the M uplink transmission blocks, and the M uplink transmission blocks are in one-to-one correspondence with the M PUSCH transmissions, where M≥1. The M PUSCH transmissions use a same time domain resource and frequency domain resource, and each uplink transmission block corresponds to a one-layer transmission or a multi-layer transmission. In various examples of the present application, a scheduling scheme is implemented in various ways, for example, a transmission scheme indication and an M value are configured in a PUSCH-Config structure in the RRC to indicate the scheduling scheme; or a transmission scheme indication and an M value are configured in a time domain resource allocation (TDRA) structure of the PUSCH in the RRC to indicate the scheduling scheme; or a pool of transmission scheme indications and M values is configured in a PUSCH-Config structure, and one transmission scheme indication and one M value in the pool are selected by a TDRA field or a frequency domain resource allocation (FDRA) field of the DCI and are applied to the PUSCH transmission scheduled by the DCI.

In this example, the M PUSCH transmissions correspond to one same MCS. The M PUSCH transmissions may correspond to one DMRS port, or to M different DMRS ports. The M PUSCH transmissions correspond to N different spatial transmission filters and N sets of power control parameters, where 1≤N≤M.

In this example, the M PUSCH transmissions may correspond to the N spatial transmission filters in one of following manners: 1) first M/2 PUSCH transmissions correspond to first N/2 spatial transmission filters, and last M/2 PUSCH transmissions correspond to last N/2 spatial transmission filters; 2) odd PUSCH transmissions correspond to first N/2 spatial transmission filters, and even PUSCH transmissions correspond to last N/2 spatial transmission filters, or 3) every two physical uplink channel transmissions are used as one group, odd groups of PUSCH transmissions correspond to first Y spatial transmission filters, and even groups of PUSCH transmissions correspond to last Y spatial transmission filters.

PUSCH transmissions corresponding to a same spatial transmission filter correspond to a same power control parameter.

In this example, the M PUSCH transmissions may correspond to a same TPMI; or, the M PUSCH transmissions correspond to N TPMIs, and PUSCH transmissions corresponding to a same spatial transmission filter correspond to a same TPMI; or a TPMI corresponding to each physical uplink channel transmission is polled and determined according to a sequence of a codebook table.

In this example, the M PUSCH transmissions may correspond to a same RV, and in this case, the number of RVs is 1; or, the M PUSCH transmissions correspond to N RVs, the number of RVs is N, and PUSCH transmissions corresponding to a same spatial transmission filter correspond to a same RV; or, an RV corresponding to each physical uplink channel transmission is polled and determined according to a set sequence, for example, RVs are selected sequentially according to the sequence of 0-2-3-1, and in this case, the number of RVs is min (M, 4).

Figure 2:
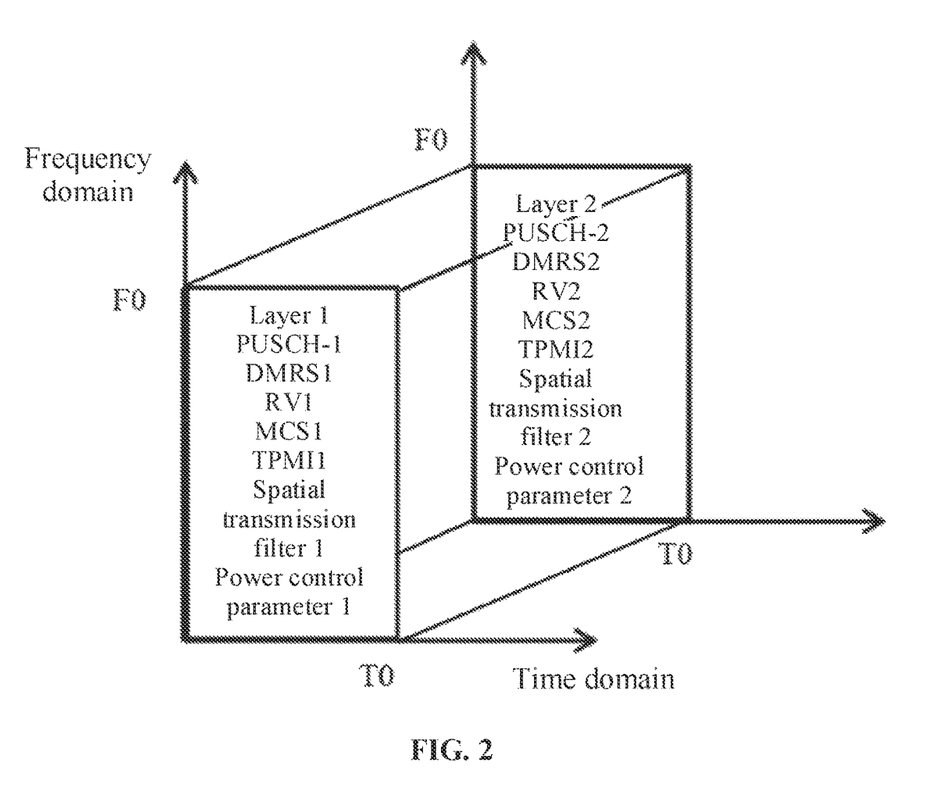
FIG. 2 is a schematic diagram of a space division multiplexing of M physical uplink transmissions according to an embodiment.

FIG. 2 is a schematic diagram of a space division multiplexing of M physical uplink transmissions according to an embodiment. As shown in FIG. 2, in a case of M=2, and N=2, a serving node schedules the UE to perform 2 PUSCH repeated transmissions on 2 same uplink transmission blocks, the 2 PUSCH transmissions use a same time-frequency domain resource (a time domain resource is represented horizontally and a frequency domain resource is represented vertically in FIG. 2), and each PUSCH transmission corresponds to a one-layer transmission. In FIG. 2, each PUSCH transmission corresponds to a same MCS, and each PUSCH transmission corresponds to different DMRS ports, RVs, TPMIs, spatial transmission filters, and power control parameters, respectively.

Example Two

In this example, M PUSCH transmissions correspond to one uplink transmission block, that is, a serving node schedules a UE to split one uplink transmission block into the M PUSCH transmissions, and data of each PUSCH transmission is different, where M≥1. The M PUSCH transmissions correspond to one same MCS. The M PUSCH transmissions may correspond to one DMRS port, or to M different DMRS ports. The M PUSCH transmissions correspond to N different spatial transmission filters and N sets of power control parameters, where 1≤N≤M.

In this example, the M PUSCH transmissions use a same time domain resource and different frequency domain resources.

In this example, the M PUSCH transmissions may correspond to the N spatial transmission filters in one of following manners: 1) first M/2 PUSCH transmissions correspond to first N/2 spatial transmission filters, and last M/2 PUSCH transmissions correspond to last N/2 spatial transmission filters; 2) odd PUSCH transmissions correspond to first N/2 spatial transmission filters, and even PUSCH transmissions correspond to last N/2 spatial transmission filters, or 3) every two physical uplink channel transmissions are used as one group, odd groups of PUSCH transmissions correspond to first Y spatial transmission filters, and even groups of PUSCH transmissions correspond to last Y spatial transmission filters.

PUSCH transmissions corresponding to a same spatial transmission filter correspond to a same power control parameter.

In this example, the M PUSCH transmissions may correspond to a same TPMI; or, the M PUSCH transmissions correspond to N TPMIs, and PUSCH transmissions corresponding to a same spatial transmission filter correspond to a same TPMI; or a TPMI corresponding to each physical uplink channel transmission is polled and determined according to a sequence of a codebook table.

In this example, the M PUSCH transmissions may correspond to a same RV, and in this case, the number of RVs is 1; or, the M PUSCH transmissions correspond to N RVs, the number of RVs is N, and PUSCH transmissions corresponding to a same spatial transmission filter correspond to a same RV; or, an RV corresponding to each physical uplink channel transmission is polled and determined according to a set sequence, for example, RVs are selected sequentially according to the sequence of 0-2-3-1, and in this case, the number of RVs is min (M, 4).

Figure 3:
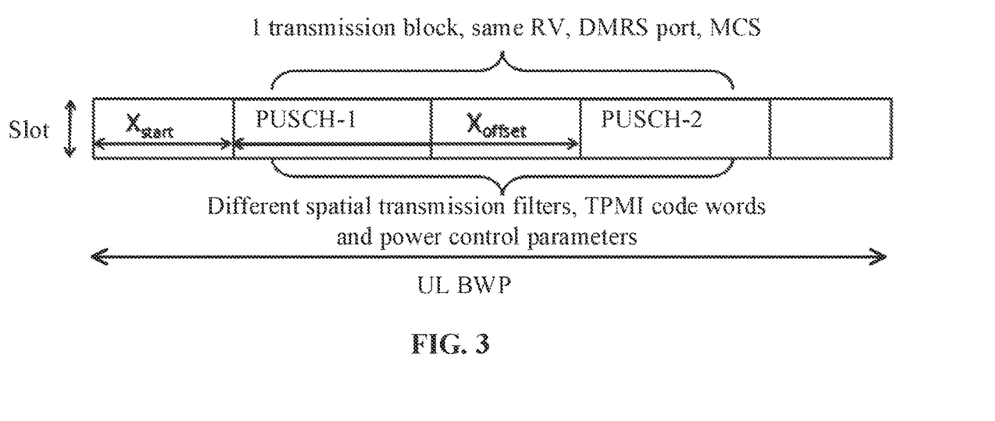
FIG. 3 is a schematic diagram of a frequency division multiplexing with M physical uplink transmissions corresponding to one uplink transmission block according to an embodiment.

In this example, the serving node may configure $X_{offset}$ between frequency domain resources for different PUSCH transmissions. $X_{offset}$ is a difference value obtained by subtracting a starting frequency of a first frequency domain resource from a starting frequency of a second frequency domain resource, where $$0 \le X_{offset} \le \frac{2N_{BWP}^{size} - M \times N_{PUSCH}^{size}}{2},$$

$N_{BWP}^{size}$ is a bandwidth of a currently active BWP, and $N_{PUSCH}^{size}$ is a bandwidth of each PUSCH transmission. In some embodiments, the serving node configures $X_{start}$ for the UE. $X_{start}$ represents a difference value from a starting frequency of the BWP to a starting frequency of a first frequency resource. In a case where $X_{start}$ is not 0 and $X_{offset}$ causes that a frequency range of a certain PUSCH transmission exceeds a boundary of the BWP, an exceeded frequency part may be transmitted within a starting position range of 0 to $X_{start}$ of the BWP.

FIG. 3 is a schematic diagram of a frequency division multiplexing with M physical uplink transmissions corresponding to one uplink transmission block according to an embodiment. As shown in FIG. 3, in a case of M=2 and N=2, the serving node schedules the UE to split 1 uplink transmission block into 2 PUSCH transmissions. The 2 PUSCH transmissions use a same time domain resource (such as a vertical slot resource in FIG. 3) and different frequency domain resources (such as horizontal resources in FIG. 3), and the 2 PUSCH transmissions correspond to a same RV, DMRS port, and MCS and correspond to 2 different spatial transmission filters, 2 different TPMIs and 2 sets of power control parameters. A frequency domain offset $X_{offset}$ is configured between frequency domain resources of the 2 PUSCH transmissions, and $X_{start}$ is configured between a frequency domain resource of the first PUSCH transmission and a starting frequency of an uplink (UL) BWP.

Example Three

In this example, M PUSCH transmissions correspond to M same uplink transmission blocks, that is, a serving node schedules a UE to perform M PUSCH repeated transmissions on M uplink transmission block, and the M uplink transmission blocks are in one-to-one correspondence with the M PUSCH transmissions, where M≥1. The M PUSCH transmissions correspond to one same MCS. In this example, the M PUSCH transmissions may correspond to one DMRS port, or to M different DMRS ports. The M PUSCH transmissions correspond to N different spatial transmission filters and N sets of power control parameters, where 1≤N≤M.

In this example, the M PUSCH transmissions use a same time domain resource and different frequency domain resources.

In this example, the M PUSCH transmissions may correspond to the N spatial transmission filters in one of following manners: 1) first M/2 PUSCH transmissions correspond to first N/2 spatial transmission filters, and last M/2 PUSCH transmissions correspond to last N/2 spatial transmission filters; 2) odd PUSCH transmissions correspond to first N/2 spatial transmission filters, and even PUSCH transmissions correspond to last N/2 spatial transmission filters, or 3) every two physical uplink channel transmissions are used as one group, odd groups of PUSCH transmissions correspond to first Y spatial transmission filters, and even groups of PUSCH transmissions correspond to last Y spatial transmission filters.

PUSCH transmissions corresponding to a same spatial transmission filter correspond to a same power control parameter.

In this example, the M PUSCH transmissions may correspond to a same TPMI; or, the M PUSCH transmissions correspond to N TPMIs, and PUSCH transmissions corresponding to a same spatial transmission filter correspond to a same TPMI; or a TPMI corresponding to each physical uplink channel transmission is polled and determined according to a sequence of a codebook table.

In this example, the M PUSCH transmissions may correspond to a same RV, and in this case, the number of RVs is 1; or, the M PUSCH transmissions correspond to N RVs, the number of RVs is N, and PUSCH transmissions corresponding to a same spatial transmission filter correspond to a same RV; or, an RV corresponding to each physical uplink channel transmission is polled and determined according to a set sequence, for example, RVs are selected sequentially according to the sequence of 0-2-3-1, and in this case, the number of RVs is min (M, 4).

Figure 4:
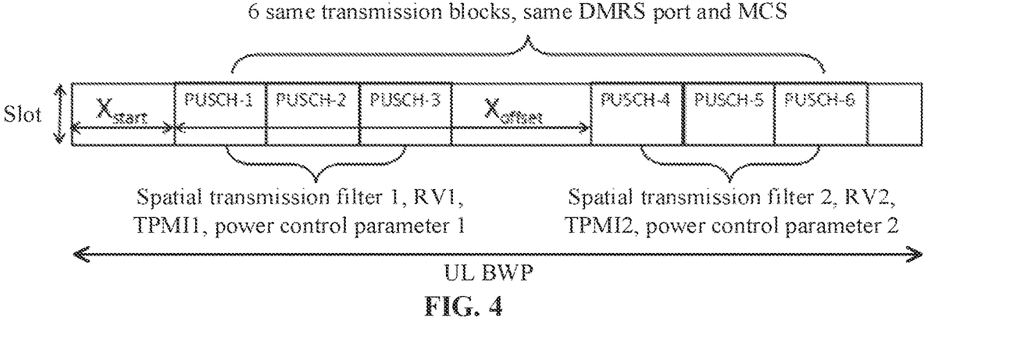
FIG. 4 is a schematic diagram of a frequency division multiplexing with M physical uplink transmissions corresponding to N spatial transmission filters according to an embodiment.

In this example, $X_{offset}$ may be configured between frequency domain resources of different PUSCH transmissions. $X_{offset}$ is a difference value obtained by subtracting a starting frequency of a first frequency domain resource from a starting frequency of a second frequency domain resource, where $$0 \leq X_{offset} \leq \frac{2N_{BWP}^{size} - M \times N_{PUSCH}^{size}}{2},$$

$N_{BWP}^{size}$ is a bandwidth of a currently active BWP, and $N_{PUSCH}^{size}$ is a bandwidth of each PUSCH transmission. In some embodiments, the serving node configures $X_{start}$ for the UE. $X_{start}$ represents a difference value from a starting frequency of the BWP to a starting frequency of a first frequency resource. In a case where $X_{start}$ is not 0 and $X_{offset}$ causes that a frequency range of one PUSCH transmission exceeds a boundary of the BWP, an exceeded frequency part may be transmitted within a starting position range of 0 to $X_{start}$ of the BWP.

FIG. 4 is a schematic diagram of a frequency division multiplexing with M physical uplink transmissions corresponding to N spatial transmission filters according to an embodiment. As shown in FIG. 4, in a case of M=6 and N=2, the serving node schedules the UE to perform 6 PUSCH repeated transmissions on 6 same uplink transmission blocks. The 6 uplink transmission blocks use a same time domain resource (such as a vertical slot resource in FIG. 4) and different frequency domain resources (such as horizontal resources in FIG. 4), and the 6 uplink transmission blocks correspond to a same DMRS port. In FIG. 4, first 3 PUSCH transmissions correspond to first 1 spatial transmission filter, last 3 PUSCH transmissions correspond to last 1 spatial transmission filter, and PUSCH transmissions with a same spatial transmission filter correspond to a same RV, that is, first 3 PUSCH transmissions correspond to spatial transmission filter 1, RV1, TPMI1 and power control parameter 1, and last 3 PUSCH transmissions correspond to spatial transmission filter 2, RV2, TPMI2 and power control parameter 2. A frequency domain offset $X_{offset}$ is configured between first 3 PUSCH transmissions and last 3 PUSCH transmissions, and $X_{start}$ is configured between a frequency domain resource of the first PUSCH transmission and the starting frequency of the UL BWP.

Example Four

In this example, M PUSCH transmissions correspond to M same uplink transmission blocks, that is, a serving node schedules a UE to perform M PUSCH repeated transmissions on the M uplink transmission blocks. The M uplink transmission blocks are in one-to-one correspondence with the M PUSCH transmissions, where M≥1. The M PUSCH transmissions correspond to one same MCS. In this example, the M PUSCH transmissions may correspond to one DMRS port, or to M different DMRS ports. In this example, the M PUSCH transmissions correspond to N different spatial transmission filters and N sets of power control parameters, where 1≤N≤M.

In this example, the M PUSCH transmissions use different time domain resources and different frequency domain resources.

In this example, the time-frequency domain resources are configured in two manners: 1) first M/2 PUSCH transmissions are transmitted on a first time unit and occupy one segment of continuous frequency domain resources, last M/2 PUSCH transmission is transmitted on a second time unit and occupies another segment of continuous frequency domain resources, and a frequency domain offset $X_{offset}$ may be configured between the two segments of frequency domain resources; 2) odd PUSCH transmissions are performed on a first time unit, even PUSCH transmissions are performed on a second time unit, and PUSCHs transmitted on the first time unit and the second time unit are distributed on a segment of continuous frequency domain resource in an interleaved manner, and the first time unit and the second time unit described above may be in one slot or may be two different slots.

In this example, transmission blocks transmitted on a same time unit have a same spatial transmission filter, and transmission blocks transmitted on different time units have different spatial transmission filters. PUSCH transmissions corresponding to a same spatial transmission filter correspond to a same power control parameter.

In this example, the M PUSCH transmissions may correspond to a same TPMI; or, the M PUSCH transmissions correspond to N TPMIs, and PUSCH transmissions corresponding to a same spatial transmission filter correspond to a same TPMI; or a TPMI corresponding to each physical uplink channel transmission is polled and determined according to a sequence of a codebook table.

In this example, the M PUSCH transmissions may correspond to a same RV, and in this case, the number of RVs is 1; or, the M PUSCH transmissions correspond to N RVs, the number of RVs is N, and PUSCH transmissions corresponding to a same spatial transmission filter correspond to a same RV; or, an RV corresponding to each physical uplink channel transmission is polled and determined according to a set sequence, for example, RVs are selected sequentially according to the sequence of 0-2-3-1, and in this case, the number of RVs is min (M, 4).

Figure 5:
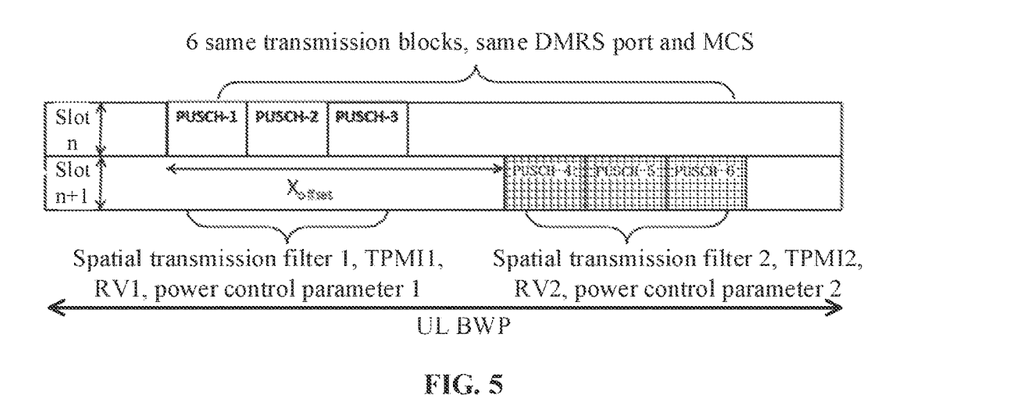
FIG. 5 is a schematic diagram of a time division multiplexing and a frequency division multiplexing with M physical uplink transmissions corresponding to N spatial transmission filters according to an embodiment.
Figure 6:
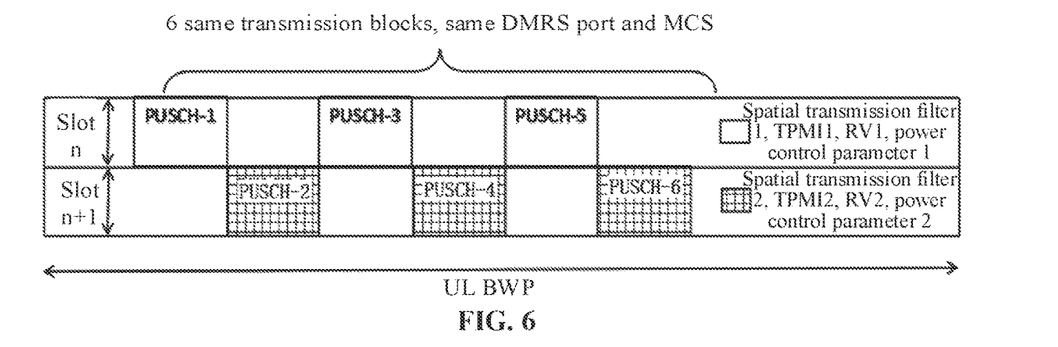
FIG. 6 is a schematic diagram of a time division multiplexing and a frequency division multiplexing with M physical uplink transmissions corresponding to N spatial transmission filters according to another embodiment.

In this example, $X_{offset}$ may be configured between frequency domain resources of different PUSCH transmissions. $X_{offset}$ is a difference value obtained by subtracting a starting frequency of a first frequency domain resource from a starting frequency of a second frequency domain resource, where $$0 \leq X_{offset} \leq \frac{2N_{BWP}^{size} - M \times N_{PUSCH}^{size}}{2},$$

$N_{BWP}^{size}$ is a bandwidth of a currently active BWP, and $N_{PUSCH}^{size}$ is a bandwidth of each PUSCH transmission. In some embodiments, the serving node configures $X_{start}$ for the UE. $X_{start}$ represents a difference value from a starting frequency of the BWP to a starting frequency of a first frequency resource. In a case where $X_{start}$ is not 0 and $X_{offset}$ causes that a frequency range of a certain PUSCH transmission exceeds a boundary of the BWP, an exceeded frequency part may be transmitted within a starting position range of 0 to $X_{start}$ of the BWP.

FIG. 5 is a schematic diagram of a time division multiplexing and a frequency division multiplexing with M physical uplink transmissions corresponding to N spatial transmission filters according to an embodiment. As shown in FIG. 5, in a case of M=6 and N=2, the serving node schedules the UE to perform 6 PUSCH repeated transmissions on 6 same uplink transmission blocks. In FIG. 5, first 3 PUSCH transmissions are transmitted on a first time unit (slot n) and occupy a segment of continuous frequency domain resource, and last 3 PUSCH transmissions are transmitted on a second time unit (slot n+1) and occupy another segment of contiguous frequency domain resources. PUSCH transmissions with a same spatial transmission filter have a same RV, and then the number of indicated RVs is 2, first 3 PUSCH transmissions correspond to spatial transmission filter 1, RV1, TPMI1 and power control parameter 1, and last 3 PUSCH transmissions correspond to spatial transmission filter 2, RV2, TPMI2, and power control parameter 2. $X_{offset}$ is configured between first 3 PUSCH transmissions and last 3 PUSCH transmissions.

FIG. 6 is a schematic diagram of a time division multiplexing and a frequency division multiplexing with M physical uplink transmissions corresponding to N spatial transmission filters according to another embodiment. As shown in FIG. 6, in a case of M=6 and N=2, the serving node schedules the UE to perform 6 PUSCH repeated transmissions on 6 same uplink transmission blocks. In FIG. 6, odd PUSCH transmissions are transmitted on a first time unit, even PUSCH transmissions are transmitted on a second time unit, and PUSCHs transmitted on the first time unit and the second time unit are distributed on a segment of continuous frequency domain resource in an interleaved manner, that is, 1st, 3rd, and 5th PUSCH transmissions are transmitted on the first time unit (slot n), and 2nd, 4th, and 6th PUSCH transmissions are transmitted on the second time unit (slot n+1). PUSCH transmissions with a same spatial transmission filter have a same RV, and then the number of indicated RV values is 2, the 1st, 3rd, and 5th PUSCH transmissions correspond to spatial transmission filter 1, RV1, TPMI1 and power control parameter 1, the 2nd, 4th, and 6th PUSCH transmissions correspond to spatial transmission filter 2, RV2, TPMI2 and power control parameter 2. In this case, $X_{offset}$ may not be configured.

Example Five

In this example, M PUSCH transmissions correspond to M same uplink transmission blocks, that is, a serving node schedules a UE to perform M PUSCH repeated transmissions on the M uplink transmission blocks. The M uplink transmission blocks are in one-to-one correspondence with the M PUSCH transmissions, where M≥1. The M PUSCH transmissions correspond to one same MCS. In this example, the M PUSCH transmissions may correspond to one DMRS port, or to M different DMRS ports. The M PUSCH transmissions correspond to N different spatial transmission filters and N sets of power control parameters, where 1≤N≤M.

In this example, the M PUSCH transmissions use a same frequency domain resource and different time domain resources. The time domain resource may be one of: different orthogonal frequency division multiplexing (OFDM) symbols within one slot, or several different slots.

In this example, the M PUSCH transmissions may correspond to the N spatial transmission filters in one of following manners: 1) first M/2 PUSCH transmissions correspond to first N/2 spatial transmission filters, and last M/2 PUSCH transmissions correspond to last N/2 spatial transmission filters; 2) odd PUSCH transmissions corresponds to first N/2 spatial transmission filters, and even PUSCH transmissions correspond to last N/2 spatial transmission filters, or 3) every two physical uplink channel transmissions are used as one group, odd groups of PUSCH transmissions correspond to first Y spatial transmission filters, and even groups of PUSCH transmissions correspond to last Y spatial transmission filters.

PUSCH transmissions corresponding to a same spatial transmission filter correspond to a same power control parameter.

In this example, the M PUSCH transmissions may correspond to a same TPMI; or, the M PUSCH transmissions correspond to N TPMIs, and PUSCH transmissions corresponding to a same spatial transmission filter correspond to a same TPMI; or a TPMI corresponding to each physical uplink channel transmission is polled and determined according to a sequence of a codebook table.

In this example, the M PUSCH transmissions may correspond to a same RV, and in this case, the number of RVs is 1; or, the M PUSCH transmissions correspond to N RVs, the number of RVs is N, and PUSCH transmissions corresponding to a same spatial transmission filter correspond to a same RV; or, an RV corresponding to each physical uplink channel transmission is polled and determined according to a set sequence, for example, RVs are selected sequentially according to the sequence of 0-2-3-1.

Figure 7:
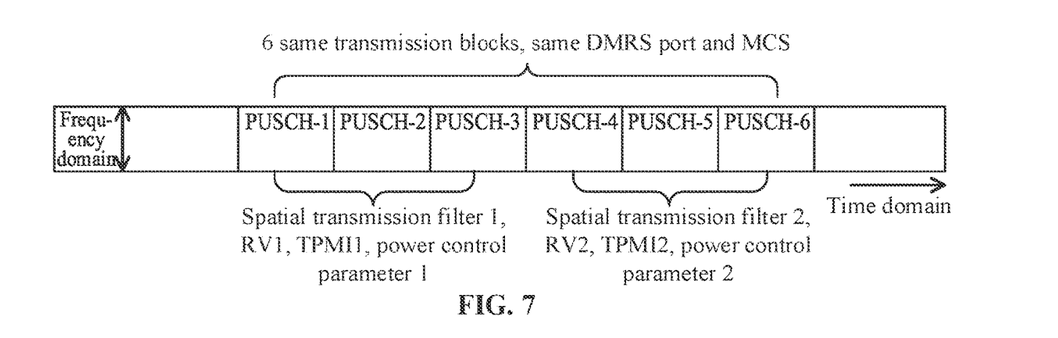
FIG. 7 is a schematic diagram of a time division multiplexing with M physical uplink transmissions corresponding to N spatial transmission filters according to an embodiment.

FIG. 7 is a schematic diagram of a time division multiplexing with M physical uplink transmissions corresponding to N spatial transmission filters according to an embodiment. As shown in FIG. 7, in a case of M=6 and N=2, the serving node schedules the UE to perform 6 PUSCH repeated transmissions on 6 same uplink transmission blocks. The 6 transmissions use a same frequency domain resource (such as, a vertical resource in FIG. 7) and different time domain resources (such as horizontal resources in FIG. 7) which are distributed on 6 continuous slots (the horizontal resources in FIG. 7 are time domain resources). The 6 PUSCH transmissions correspond to a same DMRS port and MCS, first 3 PUSCH transmissions correspond to spatial transmission filter 1, last 3 PUSCH transmissions correspond to a 2nd spatial transmission filter, and PUSCH transmissions corresponding to a same spatial transmission filter correspond to a same TPMI, RV value, and power control parameter.

The above-described embodiments achieve the diversity gain of space, a frequency domain and a beam, and fully ensure the reliability of uplink transmission data.

An embodiment of the present application further provides a receiving method applied to a serving node. The serving node sends indication information and receives M physical uplink channel transmissions corresponding to an uplink transmission block, so that the reliability of the uplink transmission is ensured.

Figure 8:
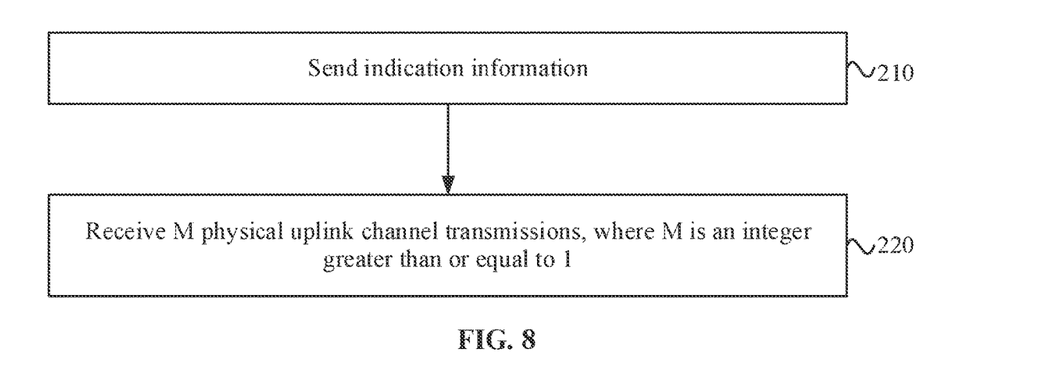
FIG. 8 is a flowchart of a receiving method according to an embodiment.

FIG. 8 is a flowchart of a receiving method provided according to an embodiment. As shown in FIG. 8, the method provided in this embodiment includes operations 210 and 220.

In 210, indication information is sent.

In 220, M physical uplink channel transmissions are received, where M is an integer greater than or equal to 1.

In an embodiment, the indication information includes at least one of: a transmission scheme indication, a time-frequency domain resource indication, or a transmission block number indication, where the time-frequency domain resource indication and the transmission block number indication respectively correspond to the transmission scheme indication; and the channel state information includes at least one of: a time-frequency domain resource, the number of transmission blocks, a spatial transmission filter, an RV, a TPMI, a DMRS port, an MCS, or a power control parameter.

In an embodiment, the indication information is indicated by at least one of following information domains: radio resource control (RRC) signaling, a media access control-control element (MAC-CE), or downlink control information (DCI).

In an embodiment, in a case where the transmission scheme indication is a first transmission scheme, the transmission block number indication corresponding to the transmission scheme indication is 1, and the time-frequency domain resource indication corresponding to the transmission scheme indication is that: the M physical uplink channel transmissions correspond to a same time domain resource; and each physical uplink channel transmission corresponds to a segment of frequency domain resource, where the segments of frequency domain resources are non-overlapping.

In an embodiment, in a case where the transmission scheme indication is a second transmission scheme, the transmission block number indication corresponding to the transmission scheme indication is M, and the time-frequency domain resource indication corresponding to the transmission scheme indication is that: the M physical uplink channel transmissions correspond to M same uplink transmission blocks; the M physical uplink channel transmissions correspond to a same time domain resource and a same frequency domain resource; and each uplink transmission block corresponds to a one-layer transmission or a multi-layer transmission.

In an embodiment, in a case where the transmission scheme indication is a third transmission scheme, the transmission block number indication corresponding to the transmission scheme indication is M, and the time-frequency domain resource indication corresponding to the transmission scheme indication is that: the M physical uplink channel transmissions correspond to M same uplink transmission blocks; the M physical uplink channel transmissions correspond to a same time domain resource; and each physical uplink channel transmission corresponds to a segment of frequency domain resource, and segments of frequency domain resources are non-overlapping.

In an embodiment, in a case where the transmission scheme indication is a fourth transmission scheme, the transmission block number indication corresponding to the transmission scheme indication is M, and the time-frequency domain resource indication corresponding to the transmission scheme indication is that: the M physical uplink channel transmissions correspond to M same uplink transmission blocks; each physical uplink channel transmission corresponds to a segment of time domain resource, and the segments of time domain resources are non-overlapping; the M physical uplink channel transmissions correspond to N segments of frequency domain resources, where the segments of frequency domain resources are non-overlapping, and N is an integer greater than or equal to 1 and N is less than or equal to M.

In an embodiment, in a case where the transmission scheme indication is a fifth transmission scheme, the transmission block number indication corresponding to the transmission scheme indication is M, and the time-frequency domain resource indication corresponding to the transmission scheme indication is that: the M physical uplink channel transmissions correspond to M same uplink transmission blocks; the M physical uplink channel transmissions correspond to a same frequency domain resource; and each physical uplink channel transmission corresponds to a segment of time domain resource, and segments of time domain resources are non-overlapping.

In an embodiment, the frequency domain resources of the M physical uplink channel transmissions include a first frequency domain resource and a second frequency domain resource; the frequency domain resources of the M physical uplink channel transmissions correspond to a first frequency offset and a second frequency offset; where the first frequency offset is a difference value between a starting frequency of the second frequency domain resource and a starting frequency of the first frequency domain resource, and the second frequency offset is a difference value between the starting frequency of the first frequency domain resource and a starting frequency of a BWP.

In an embodiment, in a case where the second frequency offset is not 0 and a frequency range of at least one physical uplink channel transmission exceeds a boundary of the BWP, a frequency part exceeding the boundary is transmitted through a target frequency band of the BWP, where the target frequency band includes a frequency band between the starting frequency of the BWP and the starting frequency of the first frequency domain resource.

In an embodiment, the M physical uplink channel transmissions correspond to a same modulation and coding strategy (MCS).

In an embodiment, the M physical uplink channel transmissions correspond to a same demodulation reference signal (DMRS) port; or the M physical uplink channel transmissions correspond to M different DMRS ports, where M is greater than or equal to 2.

In an embodiment, the M physical uplink channel transmissions correspond to a same transmitted uplink precoding matrix indicator (TPMI); or physical uplink channel transmissions corresponding to a same spatial transmission filter correspond to a same TPMI; or, each physical uplink channel transmission sequentially corresponds to one TPMI, and TPMIs are circularly arranged according to a sequence of a codebook table.

In an embodiment, the M physical uplink channel transmissions correspond to a same redundancy version (RV); or physical uplink channel transmissions corresponding to a same spatial transmission filter correspond to a same RV; or, each physical uplink channel transmission sequentially corresponds to one RV, and RVs are circularly arranged according to a set sequence.

In an embodiment, the M physical uplink channel transmissions correspond to N spatial transmission filters, and the M physical uplink channel transmissions correspond to N sets of power control parameters, where N is an integer greater than or equal to 1 and N is less than or equal to M. The N spatial transmission filters are determined according to one of: a transmission configuration indication (TCI) state, quasi-co-location (QCL), sounding reference signal resource indicator (SRI) information, spatial relation information, a sounding reference signal (SRS), a channel state information reference signal (CSI-RS), or a synchronization signal block (SSB).

In an embodiment, first X physical uplink channel transmissions among the M physical uplink channel transmissions correspond to first Y spatial transmission filters, and last X physical uplink channel transmissions among the M physical uplink channel transmissions correspond to last Y spatial transmission filters; or, odd physical uplink channel transmissions among the M physical uplink channel transmissions correspond to first Y spatial transmission filters, and even physical uplink channel transmissions among the M physical uplink channel transmissions correspond to last Y spatial transmission filters; or, every two physical uplink channel transmissions among the M physical uplink channel transmissions are used as one group, odd groups of physical uplink channel transmissions correspond to first Y spatial transmission filters, and even groups of physical uplink channel transmissions correspond to last Y spatial transmission filters; where X is a half of M, Y is a half of N.

In an embodiment, physical uplink channel transmissions corresponding to a same spatial transmission filter correspond to a same power control parameter.

The receiving method applied to the serving node in this embodiment is opposite to the information determination method applied to the UE, and technical details not described in this embodiment may be referred to any one of the above embodiments.

Figure 9:
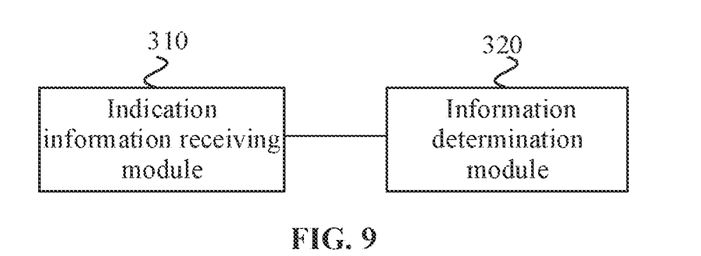
FIG. 9 is a structural diagram of an information determination device according to an embodiment.

An embodiment of the present application further provides an information determination device. FIG. 9 is a structural diagram of an information determination device according to an embodiment. As shown in FIG. 9, the information determination device includes an indication information receiving module 310 and an information determination module 320.

The indication information receiving module 310 is configured to receive indication information.

The information determination module 320 is configured to determine channel state information of M physical uplink channel transmissions according to the indication information, where M is an integer greater than or equal to 1.

According to the information determination device of this embodiment, channel state information of each repeated transmission is correspondingly determined according to the indication information, and the transmission is performed accordingly so that the transmission reliability of the physical uplink channel is improved.

In an embodiment, the indication information includes at least one of: a transmission scheme indication, a time-frequency domain resource indication, or a transmission block number indication. The time-frequency domain resource indication and the transmission block number indication respectively correspond to the transmission scheme indication; and the channel state information includes at least one of: a time-frequency domain resource; the number of transmission blocks, a spatial transmission filter, a redundancy version (RV), a transmitted precoding matrix indicator (TPMI), a demodulation reference signal (DMRS) port, a modulation and coding scheme (MCS), or a power control parameter.

In an embodiment, the indication information is indicated by at least one of following information domains: radio resource control (RRC) signaling, a media access control-control element (MAC-CE), or downlink control information (DCI).

In an embodiment, in a case where the transmission scheme indication is a first transmission scheme, the transmission block number indication corresponding to the transmission scheme indication is 1, and the time-frequency domain resource indication corresponding to the transmission scheme indication is that: the M physical uplink channel transmissions correspond to a same time domain resource; and each physical uplink channel transmission corresponds to a segment of frequency domain resource, and segments of frequency domain resources are non-overlapping.

In an embodiment, in a case where the transmission scheme indication is a second transmission scheme, the transmission block number indication corresponding to the transmission scheme indication is M, and the time-frequency domain resource indication corresponding to the transmission scheme indication is that: the M physical uplink channel transmissions correspond to M same uplink transmission blocks; the M physical uplink channel transmissions correspond to a same time domain resource and a same frequency domain resource; and each uplink transmission block corresponds to a one-layer transmission or a multi-layer transmission.

In an embodiment, in a case where the transmission scheme indication is a third transmission scheme, the transmission block number indication corresponding to the transmission scheme indication is M, and the time-frequency domain resource indication corresponding to the transmission scheme indication is that: the M physical uplink channel transmissions correspond to M same uplink transmission blocks; the M physical uplink channel transmissions correspond to a same time domain resource; and each physical uplink channel transmission corresponds to a segment of frequency domain resource, and segments of frequency domain resources are non-overlapping.

In an embodiment, in a case where the transmission scheme indication is a fourth transmission scheme, the transmission block number indication corresponding to the transmission scheme indication is M, and the time-frequency domain resource indication corresponding to the transmission scheme indication is that: the M physical uplink channel transmissions correspond to M same uplink transmission blocks; each physical uplink channel transmission corresponds to a segment of time domain resource, and segments of time domain resources are non-overlapping;

and the M physical uplink channel transmissions correspond to N segments of frequency domain resources, and the segments of frequency domain resources are non-overlapping, where N is an integer greater than or equal to 1 and N is less than or equal to M.

In an embodiment, in a case where the transmission scheme indication is a fifth transmission scheme, the transmission block number indication corresponding to the transmission scheme indication is M, and the time-frequency domain resource indication corresponding to the transmission scheme indication is that: the M physical uplink channel transmissions correspond to M same uplink transmission blocks; the M physical uplink channel transmissions correspond to a same frequency domain resource; and each physical uplink channel transmission corresponds to a segment of time domain resource, and segments of time domain resources are non-overlapping.

In an embodiment, the frequency domain resources of the M physical uplink channel transmissions include a first frequency domain resource and a second frequency domain resource; the frequency domain resources of the M physical uplink channel transmissions correspond to a first frequency offset and a second frequency offset; where the first frequency offset is a difference value between a starting frequency of the second frequency domain resource and a starting frequency of the first frequency domain resource, and the second frequency offset is a difference value between the starting frequency of the first frequency domain resource and a starting frequency of a bandwidth part (BWP).

In an embodiment, in a case where the second frequency offset is not 0 and a frequency range of at least one physical uplink channel transmission exceeds a boundary of the BWP, a frequency part exceeding the boundary is transmitted through a target frequency band of the BWP, where the target frequency band includes a frequency band between the starting frequency of the BWP and the starting frequency of the first frequency domain resource.

In an embodiment, the M physical uplink channel transmissions correspond to a same modulation and coding strategy (MCS).

In an embodiment, the M physical uplink channel transmissions correspond to a same demodulation reference signal (DMRS) port; or the M physical uplink channel transmissions correspond to M different DMRS ports, where M is greater than or equal to 2.

In an embodiment, the M physical uplink channel transmissions correspond to a same transmitted uplink precoding matrix indicator (TPMI); or the physical uplink channel transmissions corresponding to a same spatial transmission filter correspond to a same TPMI; or, each physical uplink channel transmission sequentially corresponds to one TPMI, and TPMIs are circularly arranged according to a sequence of a codebook table.

In an embodiment, the M physical uplink channel transmissions correspond to a same redundancy version (RV); or physical uplink channel transmissions corresponding to a same spatial transmission filter correspond to a same RV; or, each physical uplink channel transmission sequentially corresponds to one RV, and RVs are circularly arranged according to a set sequence.

In an embodiment, the M physical uplink channel transmissions correspond to N spatial transmission filters, and the M physical uplink channel transmissions correspond to N sets of power control parameters, where N is an integer greater than or equal to 1 and N is less than or equal to M. The N spatial transmission filters are determined according to one of: a transmission configuration indication (TCI) state, quasi-co-location (QCL), sounding reference signal resource indicator (SRI) information, spatial relation information, a sounding reference signal (SRS), a channel state information reference signal (CSI-RS), or a synchronization signal block (SSB).

In an embodiment, first X physical uplink channel transmissions among the M physical uplink channel transmissions correspond to first Y spatial transmission filters, and last X physical uplink channel transmissions among the M physical uplink channel transmissions correspond to last Y spatial transmission filters; or, odd physical uplink channel transmissions among the M physical uplink channel transmissions correspond to first Y spatial transmission filters, and even physical uplink channel transmissions among the M physical uplink channel transmissions correspond to last Y spatial transmission filters; or, every two physical uplink channel transmissions among the M physical uplink channel transmissions are used as one group, odd groups of physical uplink channel transmissions correspond to first Y spatial transmission filters, and even groups of physical uplink channel transmissions correspond to last Y spatial transmission filters; where X is a half of M, Y is a half of N.

In an embodiment, physical uplink channel transmissions corresponding to a same spatial transmission filter correspond to a same power control parameter.

The information determination device proposed in this embodiment belongs to a same concept as the information determination method proposed in the above-described embodiments, and technical details not described in this embodiment may be referred to any one of the above embodiments.

Figure 10:
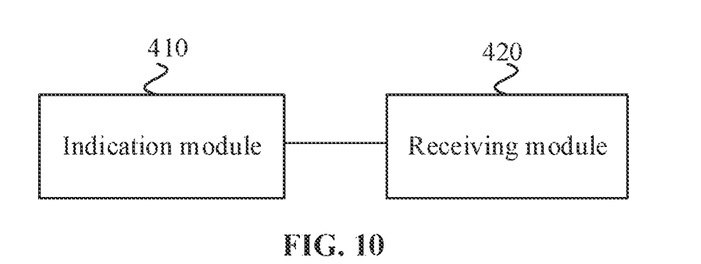
FIG. 10 is a structural diagram of a receiving device according to an embodiment.

An embodiment of the present application further provides a receiving device. FIG. 10 is a structural diagram of a receiving device according to an embodiment. As shown in FIG. 10, the receiving device includes an indication module 410 and a receiving module 420.

The indication module 410 is configured to send indication information.

The receiving module 420 is configured to receive M physical uplink channel transmissions, where M is an integer greater than or equal to 1.

According to the receiving device of this embodiment, the indication information is sent, and M physical uplink channel transmissions corresponding to uplink transmission blocks are received, so that the reliability of an uplink transmission is ensured.

The indication information includes at least one of: a transmission scheme indication, a time-frequency domain resource indication, or a transmission block number indication. The time-frequency domain resource indication and the transmission block number indication respectively correspond to the transmission scheme indication; and the channel state information includes at least one of: a time-frequency domain resource, the number of transmission blocks, a spatial transmission filter, a redundancy version (RV), a transmitted precoding matrix indicator (TPMI), a demodulation reference signal (DMRS) port, a modulation and coding scheme (MCS), or a power control parameter.

In an embodiment, the indication information is indicated by at least one of following information domains: radio resource control (RRC) signaling, a media access control-control element (MAC-CE), or downlink control information (DCI).

In an embodiment, in a case where the transmission scheme indication is a first transmission scheme, the transmission block number indication corresponding to the transmission scheme indication is 1, and the time-frequency domain resource indication corresponding to the transmission scheme indication is that: the M physical uplink channel transmissions correspond to a same time domain resource; and each physical uplink channel transmission corresponds to a segment of frequency domain resource, and segments of frequency domain resources are non-overlapping.

In an embodiment, in a case where the transmission scheme indication is a second transmission scheme, the transmission block number indication corresponding to the transmission scheme indication is M, and the time-frequency domain resource indication corresponding to the transmission scheme indication is that: the M physical uplink channel transmissions correspond to M same uplink transmission blocks; the M physical uplink channel transmissions correspond to a same time domain resource and a same frequency domain resource; and each uplink transmission block corresponds to a one-layer transmission or a multi-layer transmission.

In an embodiment, in a case where the transmission scheme indication is a third transmission scheme, the transmission block number indication corresponding to the transmission scheme indication is M, and the time-frequency domain resource indication corresponding to the transmission scheme indication is that: the M physical uplink channel transmissions correspond to M same uplink transmission blocks; and the M physical uplink channel transmissions correspond to a same time domain resource; and each physical uplink channel transmission corresponds to a segment of frequency domain resource, and segments of frequency domain resources are non-overlapping.

In an embodiment, in a case where the transmission scheme indication is a fourth transmission scheme, the transmission block number indication corresponding to the transmission scheme indication is M, and the time-frequency domain resource indication corresponding to the transmission scheme indication is that: the M physical uplink channel transmissions correspond to M same uplink transmission blocks; each physical uplink channel transmission corresponds to a segment of time domain resource, and segments of time domain resources are non-overlapping; and the M physical uplink channel transmissions correspond to N segments of frequency domain resources, and the segments of frequency domain resources are non-overlapping, where N is an integer greater than or equal to 1 and N is less than or equal to M.

In an embodiment, in a case where the transmission scheme indication is a fifth transmission scheme, the transmission block number indication corresponding to the transmission scheme indication is M, and the time-frequency domain resource indication corresponding to the transmission scheme indication is that: the M physical uplink channel transmissions correspond to M same uplink transmission blocks; the M physical uplink channel transmissions correspond to a same frequency domain resource; and each physical uplink channel transmission corresponds to a segment of time domain resource, and segments of time domain resources are non-overlapping.

In an embodiment, the frequency domain resources of the M physical uplink channel transmissions include a first frequency domain resource and a second frequency domain resource; and the frequency domain resources of the M physical uplink channel transmissions correspond to a first frequency offset and a second frequency offset. The first frequency offset is a difference value between a starting frequency of the second frequency domain resource and a starting frequency of the first frequency domain resource, and the second frequency offset is a difference value between the starting frequency of the first frequency domain resource and a starting frequency of a bandwidth part (BWP).

In an embodiment, in a case where the second frequency offset is not 0 and a frequency range of at least one physical uplink channel transmission exceeds a boundary of the BWP, a frequency part exceeding the boundary is transmitted through a target frequency band of the BWP, where the target frequency band includes a frequency band between the starting frequency of the BWP and the starting frequency of the first frequency domain resource.

In an embodiment, the M physical uplink channel transmissions correspond to a same modulation and coding strategy (MCS).

In an embodiment, the M physical uplink channel transmissions correspond to a same demodulation reference signal (DMRS) port; or the M physical uplink channel transmissions correspond to M different DMRS ports, where M is greater than or equal to 2.

In an embodiment, the M physical uplink channel transmissions correspond to a same transmitted uplink precoding matrix indicator (TPMI); or physical uplink channel transmissions corresponding to a same spatial transmission filter correspond to a same TPMI; or, each physical uplink channel transmission sequentially corresponds to one TPMI, and TPMIs are circularly arranged according to a sequence of a codebook table.

In an embodiment, the M physical uplink channel transmissions correspond to a same redundancy version (RV); or physical uplink channel transmissions corresponding to a same spatial transmission filter correspond to a same RV; or, each physical uplink channel transmission sequentially corresponds to one RV, and RVs are circularly arranged according to a set sequence.

In an embodiment, the M physical uplink channel transmissions correspond to N spatial transmission filters, and the M physical uplink channel transmissions correspond to N sets of power control parameters, where N is an integer greater than or equal to 1 and N is less than or equal to M. The N spatial transmission filters are determined according to one of: a transmission configuration indication (TCI) state, quasi-co-location (QCL), sounding reference signal resource indicator (SRI) information, spatial relation information, a sounding reference signal (SRS), a channel state information reference signal (CSI-RS), or a synchronization signal block (SSB).

In an embodiment, first X physical uplink channel transmissions among the M physical uplink channel transmissions correspond to first Y spatial transmission filters, and last X physical uplink channel transmissions among the M physical uplink channel transmissions correspond to last Y spatial transmission filters; or, odd physical uplink channel transmissions among the M physical uplink channel transmissions correspond to first Y spatial transmission filters, and even physical uplink channel transmissions among the M physical uplink channel transmissions correspond to last Y spatial transmission filters; or, every two physical uplink channel transmissions among the M physical uplink channel transmissions are used as one group, odd groups of physical uplink channel transmissions correspond to first Y spatial transmission filters, and even groups of physical uplink channel transmissions correspond to last Y spatial transmission filters; where X is a half of M, Y is a half of N.

In an embodiment, physical uplink channel transmissions corresponding to a same spatial transmission filter correspond to a same power control parameter.

The receiving device proposed in this embodiment belongs to a same concept as the receiving method proposed in the above-described embodiments, and technical details not described in this embodiment may be referred to any one of the above embodiments.

An embodiment of the present disclosure further provides a communication node. The information determination method may be performed by the information determination device, the information determination device may be implemented by means of software and/or hardware and is integrated in the communication node, and in this case, the communication node mainly refers to a user terminal. The receiving method may be performed by the receiving device, the receiving device may be implemented by means of software and/or hardware and is integrated in the communication node, and in this case, the communication node mainly refers to as a serving node.

Figure 11:
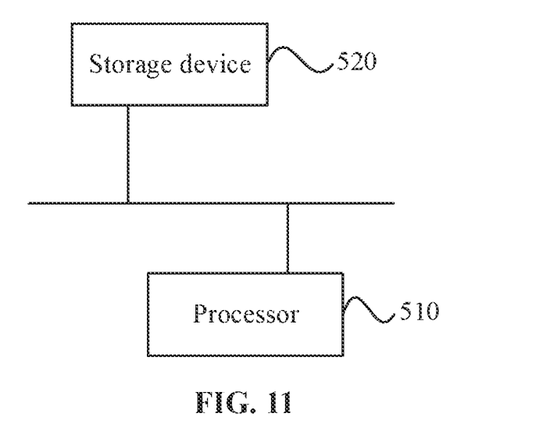
FIG. 11 is a structural diagram of a hardware of a communication node according to an embodiment.

FIG. 11 is a structural diagram of a hardware of a communication node according to an embodiment. As shown in FIG. 11, the communication node provided in this embodiment includes a processor 510 and a storage device 520. One or more processors may be provided in the communication node, and one processor 510 is used as an example in FIG. 11. The processor 510 and the storage device 520 in the device may be connected by a bus or in other manners, and the processor 510 and the storage device 520 in the device being connected by the bus is used as an example in FIG. 11.

One or more programs, when executed by the one or more processors 510, cause the one or more processors to implement the information determination method or the receiving method of any one of the embodiments described above.

The storage device 520 in the communication node serves as a computer-readable storage medium and may be used for storing one or more programs, and the program may be a software program, a computer-executable program and a module, such as a program instruction/module (for example, the module in the information determination device shown in FIG. 9, including the indication information receiving module 310 and the information determination module 320) corresponding to the information determination method in the embodiments of the present disclosure. The processor 510 executes various functional applications and data processing of the communication node, i.e., implements the information determination method or the receiving method in the above-described method embodiments, by executing software programs, instructions, and modules stored in the storage device 520.

The storage device 520 mainly includes a program storage region and a data storage region, where the program storage region may store an operating system, an application program required for at least one function; the data storage region may store data or the like (such as indication information, physical uplink channel transmission in the above-described embodiment) created according to the use of the device. Moreover, the storage device 520 may include a high-speed random access memory and may also include a non-volatile memory, such as at least one magnetic disk storage device, flash memory device, or other non-volatile solid-state memory devices. In some instances, the storage device 520 may include a memory remotely disposed with respect to the processor 510, the remote memory may be connected to the communication node over a network. Instances of such networks include, but are not limited to, an Internet, an intranet, a local area network, a mobile communication network, and combinations thereof.

When the one or more programs included in the communication node described above are executed by the one or more processors 510, following operations are implemented: indication information is received; and channel state information of M physical uplink channel transmissions is determined according to the indication information, where M is an integer greater than or equal to 1.

Alternatively, when the one or more programs included in the communication node described above are executed by the one or more processors 510, following operations are implemented: indication information is sent; and M physical uplink channel transmissions are received, where M is an integer greater than or equal to 1.

The communication node proposed in this embodiment belongs to a same concept as the information determination method or the receiving method proposed in the above-described embodiments, and technical details not described in this embodiment may be referred to any one of the above embodiments.

An embodiment of the present application further provides a storage medium containing a computer-executable instruction, where the computer-executable instruction is configured to perform, when executed by a computer processor, the information determination method or the receiving method.

Those skilled in the art will appreciate from the above description of the implementation manners that the present application may be implemented by means of software and general purpose hardware, and of course, may also be implemented by hardware. Based on this understanding, the technical scheme of the present application may be embodied in a form of a software product, and the computer software product may be stored in a computer-readable storage medium, such as a floppy disk of a computer, a read-only memory (ROM), a random access memory (RAM), a flash memory (FLASH), a hard disk or an optional disk, and includes multiple instructions to enable a computer apparatus (which may be a personal computer, a server, or a network apparatus, etc.) to perform the information determination method or the receiving method of any of the embodiments of the present application.

The above description is only an exemplary embodiment of the present application and is not intended to limit the scope of protection of the present application.

Any block diagram of the logic flow in the accompanying drawings of the present application may represent program steps, or may represent interconnected logic circuits, modules, and functions, or may represent a combination of program steps and logic circuits, modules, and functions. The computer program may be stored in a memory. The memory may be of any type suitable for the local technical environment and may be implemented using any suitable data storage technology, such as, but not limited to, a read-only memory (ROM), a random access memory (RAM), an optical memory device and system (digital video disc (DVD) or compact disk (CD)), etc. The computer-readable medium may include a non-transitory storage medium. The data processor may be of any type suitable for the local technical environment, such as, but not limited to, a general-purpose computer, a specialized computer, a microprocessor, a digital signal processor (DSP), an application-specific integrated circuit (ASIC), a field programmable gate array (FPGA), and a processor based on a multi-core processor architecture.

What is claimed is:

1. An information determination method, comprising:
receiving indication information; and
determining channel state information of M physical uplink shared channel transmissions according to the indication information, wherein M is an integer greater than or equal to 1;
wherein the indication information comprises a transmission block number indication, the channel state information comprises at least one of: a time-frequency domain resource, a number of transmission blocks, a spatial transmission filter;
wherein when the transmission block number indication is M, and the time-frequency domain resource satisfies following characteristics: the M physical uplink shared channel transmissions correspond to a same frequency domain resource; and the M physical uplink shared channel transmissions respectively correspond to M segments of time domain resources, and the M segments of time domain resources are non-overlapping; and
wherein the M physical uplink shared channel transmissions correspond to N spatial transmission filters, and wherein N is an integer greater than or equal to 1 and N is less than or equal to M.

2. The method of claim 1, wherein the indication information further comprises at least one of: a transmission scheme indication, or a time-frequency domain resource indication, wherein,
the time-frequency domain resource indication and the transmission block number indication respectively correspond to the transmission scheme indication; and
the channel state information further comprises at least one of: a redundancy version (RV), a transmitted precoding matrix indicator (TPMI), a demodulation reference signal (DMRS) port, a modulation and coding scheme (MCS), or a power control parameter.

3. The method of claim 1, wherein the indication information is indicated by at least one of following information domains: radio resource control (RRC) signaling, a media access control-control element (MAC-CE), or downlink control information (DCI).

4. The method of claim 1, wherein the M physical uplink shared channel transmissions correspond to a same MCS.

5. The method of claim 1, wherein the M physical uplink shared channel transmissions correspond to a same DMRS port; or the M physical uplink shared channel transmissions correspond to M different DMRS ports, wherein M is greater than or equal to 2.

6. The method of claim 1, wherein the M physical uplink shared channel transmissions correspond to a same TPMI; or physical uplink shared channel transmissions corresponding to a same spatial transmission filter correspond to a same TPMI; or the M physical uplink shared channel transmissions sequentially correspond to M TPMIs, and the M TPMIs are circularly arranged according to a sequence of a codebook table.

7. The method of claim 1, wherein the M physical uplink shared channel transmissions correspond to a same RV; physical uplink shared channel transmissions corresponding to a same spatial transmission filter correspond to a same RV; or the M physical uplink shared channel transmissions sequentially correspond to M RVs, and the M RVs are circularly arranged according to a set sequence.

8. The method of claim 1, wherein the M physical uplink shared channel transmissions correspond to N sets of power control parameters.

9. The method of claim 1, wherein
first X physical uplink shared channel transmissions among the M physical uplink shared channel transmissions correspond to first Y spatial transmission filters, and last X physical uplink shared channel transmissions among the M physical uplink shared channel transmissions correspond to last Y spatial transmission filters;
odd physical uplink shared channel transmissions among the M physical uplink shared channel transmissions correspond to first Y spatial transmission filters, and even physical uplink shared channel transmissions among the M physical uplink shared channel transmissions correspond to last Y spatial transmission filters; or
every two physical uplink shared channel transmissions among the M physical uplink shared channel transmissions are used as one group, odd groups correspond to first Y spatial transmission filters, and even groups correspond to last Y spatial transmission filters;
wherein X is a half of M, Y is a half of N, M is an even number, and N is an even number.

10. The method of claim 9, wherein physical uplink shared channel transmissions corresponding to a same spatial transmission filter correspond to a same power control parameter.

11. A communication node, comprising:
at least one processor; and
a storage device, which is configured to store at least one program;
wherein when the at least one program is executed by the at least one processor, the at least one processor implements the information determination method of claim 1.

12. A non-transitory computer-readable storage medium storing a computer program thereon, wherein the computer program, when executed by a processor, implements the information determination method of claim 1.

13. The method of claim 1, wherein the N spatial transmission filters are determined according to one of: a transmission configuration indication (TCI) state, quasi-co-location (QCL) information, sounding reference signal resource indicator (SRI) information, spatial relation information, a sounding reference signal (SRS), a channel state information reference signal (CSI-RS), or a synchronization signal block (SSB).

14. A receiving method, comprising:
sending indication information; and
receiving M physical uplink shared channel transmissions, wherein M is an integer greater than or equal to 1;
wherein the indication information comprises a transmission block number indication, channel state information comprises at least one of: a time-frequency domain resource, a number of transmission blocks, a spatial transmission filter;
wherein when the transmission block number indication is M, and the time-frequency domain resource satisfies following characteristics: the M physical uplink shared channel transmissions correspond to a same frequency domain resource; and the M physical uplink shared channel transmissions respectively correspond to M segments of time domain resources, and the M segments of time domain resources are non-overlapping; and wherein the M physical uplink shared channel transmissions correspond to N spatial transmission filters, and wherein N is an integer greater than or equal to 1 and N is less than or equal to M.

* * * * *